United States Patent [19]

Böhme et al.

[11] 4,322,779
[45] Mar. 30, 1982

[54] PHOTOFLOOD LIGHT

[75] Inventors: Hermann Böhme, Wolfenbüttel; Georg Lohse, Vechelde, both of Fed. Rep. of Germany

[73] Assignee: Dr. Ing. Böhme & Co., Braunschweig, Fed. Rep. of Germany

[21] Appl. No.: 97,873

[22] Filed: Nov. 27, 1979

[30] Foreign Application Priority Data

Nov. 27, 1978 [DE] Fed. Rep. of Germany ....... 2851245

[51] Int. Cl.³ .......................................... G03B 15/02
[52] U.S. Cl. ..................................... 362/17; 362/18; 362/283; 362/294; 362/343
[58] Field of Search .................. 362/17, 18, 283, 294, 362/343

[56] References Cited

U.S. PATENT DOCUMENTS 4,141,057 2/1979 Dietrich et al. ...................... 362/18

Primary Examiner—Stephen J. Lechert, Jr.
Attorney, Agent, or Firm—Michael J. Striker

[57] ABSTRACT

A photoflood light is disclosed having a generally rectangular housing provided with a reflector which is mounted as to be located forwardly of the housing and having additional portions which are pivotable relative to the housing and, when moved to a position of non-use, i.e. storage and/or transport, form together with the housing and the other components a flat generally rectangular body.

21 Claims, 3 Drawing Figures

PHOTOFLOOD LIGHT

BACKGROUND OF THE INVENTION

This invention relates to photoflood lights, i.e. to lights used for artificial illumination in the context of photography.

A light of the type in question is commercially available in the Federal Republic of Germany from Dr. Ing. Boehme & Co., as "Type 1000 K". This light has a housing composed of a relatively flat first section which merges into a second section having a height approximately three times that of the corresponding dimension of the first section. A U-shaped bracket is pivoted to the end faces of the flat first section and has arms of a length which is shorter than the spacing between the pivot axis of the bracket and the housing surface where the light source (lamp) is located. This means that after bracket and housing have been pivoted relative to one another through a certain angle, the higher second housing section will abut the bracket. The first section accommodates electrical components, such as switches, fuses and the like; the second section, being larger, accommodates the reflector, the elongated lamp and the socket for the lamp, among others. Two light baffles are pivoted to the reflector, so as to be pivotable about axes extending parallel to the lamp axis and above the same. When the light is not in use, the baffles are pivoted down over the reflector so as to cover the same and, in effect, form a front wall of the housing. These baffles are not a part of the reflector, but serve only as auxiliary light-directing devices.

A problem with this otherwise very satisfactory prior-art device is that it is relatively large. This is due to the fact that the width of the bracket arm extending parallel to the lamp axis corrresponds approximately to the height of the flat first housing section, which means that the housing overall is about three times higher than this arm, which serves as a mounting rail for securing the light on a camera or the like, is wide.

SUMMARY OF THE INVENTION

It is, therefore, an object of the invention to improve a light of the type under discussion, by making it more compact.

A more particular object of the invention is to make a light of the type of under discussion more compact without, however, thereby interfering with its operation and effectiveness.

In keeping with the above objects, and with others which will become apparent hereafter, one feature of the invention resides in a photoflood light comprising, briefly stated, an elongated housing having a front face; a reflector element of curved cross-section mounted forwardly of the front face and extending lengthwise of the housing; a lamp mounted within the reflector and extending lengthwise of the same; and a pair of light baffles mounted for tilting movement about pivot axes extending along respective opposite longitudinal edges of the reflector element, to and from a rest position in which they are located at least in parallel with the planes of respective major surfaces of the housing and define with the same a generally rectangular body.

The photoflood light according to the present invention thus does not have the lamp socket or the reflector located in a second housing section, as in the prior-art device. Instead, the reflector is freely spaced from and located above the upper longitudinal side of the flat housing. The reflector is of tripartite construction, being composed of the two light baffles and a reflector portion on the housing and having a curved cross-sectional configuration, whereby it is assured that in the light, in its neutral position in which it is not in use, will form a body having a flat right-angular shape. The two light baffles may each have one strip-based portion adjacent their respective pivot axis which may be located behind or next to the longitudinal axis of the lamp and can thus act directly as a part of the reflector. It is important that when the baffles are in the position in which the light is not in use, they can be folded flat against the flat sides of the housing so as to be located approximately in the planes of these flat sides, whereby the thickness of the overall body in effect is determined by the width of the housing which contains the electrical components.

It is advantageous to provide a bracket as in the prior-art device and to mount it so that it can pivot about an axis extending parallel to the axis of the lamp, into a position in which it covers the front side of the lamp when the light is not to be used. It may also be advantageous if a plane passing through the pivot axis and the lamp axis is a symmetry axis of the light in the position in which the latter is not in use. The height of the housing may correspond approximately to the width of that portion of the bracket which extends parallel to the axis of the lamp.

It is evident from the above that the height of the photoflood light according to the present invention is only about one-third of the height of the prior-art light. The object of obtaining a compact construction is therefore fully achieved. When the light according to the invention is not being used one obtains a smooth-surfaced flat generally quadratic body which can be extremely readily packaged and stored. Moreover, in this position of storage the bracket which has been pivoted in front of the lamp of the device provides excellent protection for this lamp so that the protection afforded in the prior art by pivoting the light baffles in front of the lamp, is not needed in the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
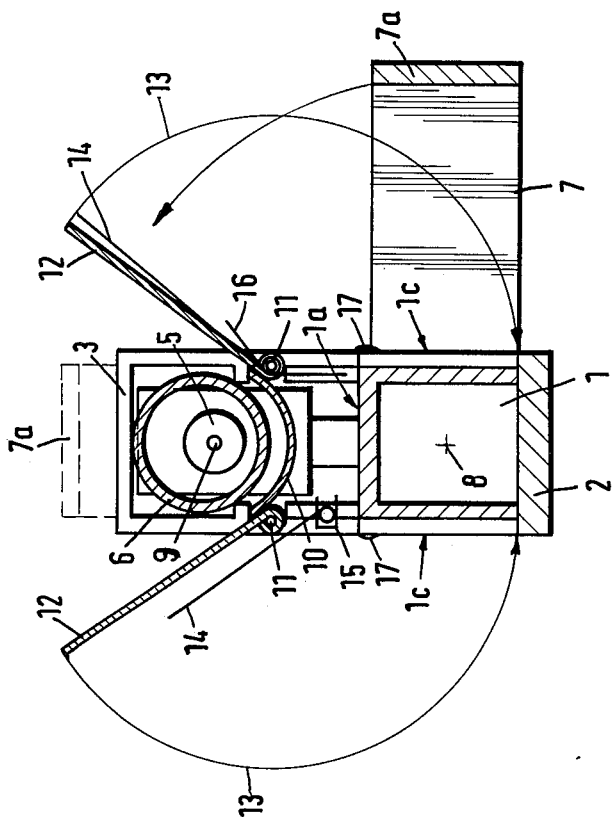
FIG. 1 is a cross section through a photoflood light according to the present invention, with the light baffles moved to a position of use.

As shown in the drawing, the photoflood light accoording to the present invention has a housing 1 which is of generally quadratic (more particularly rectangular) flat shape having an upper longitudinal side 1a, lateral sides 1b and flat sides or major surfaces 1c. On its lower longitudinal side the housing 1 is closed by a removable cover 2. The upper longitudinal side 1a is provided with two sockets 3 accommodating socket portions 4 for the mechanical retention and electrical contacting of a lamp 5 (i.e. the light source) which is here illustrated as an elongated bulb having socket connections at both ends. In addition, a transparent protective tube 6 is shown which surrounds the lamp 5 and which is also releasably mounted in the two sockets 3.

Figure 3:
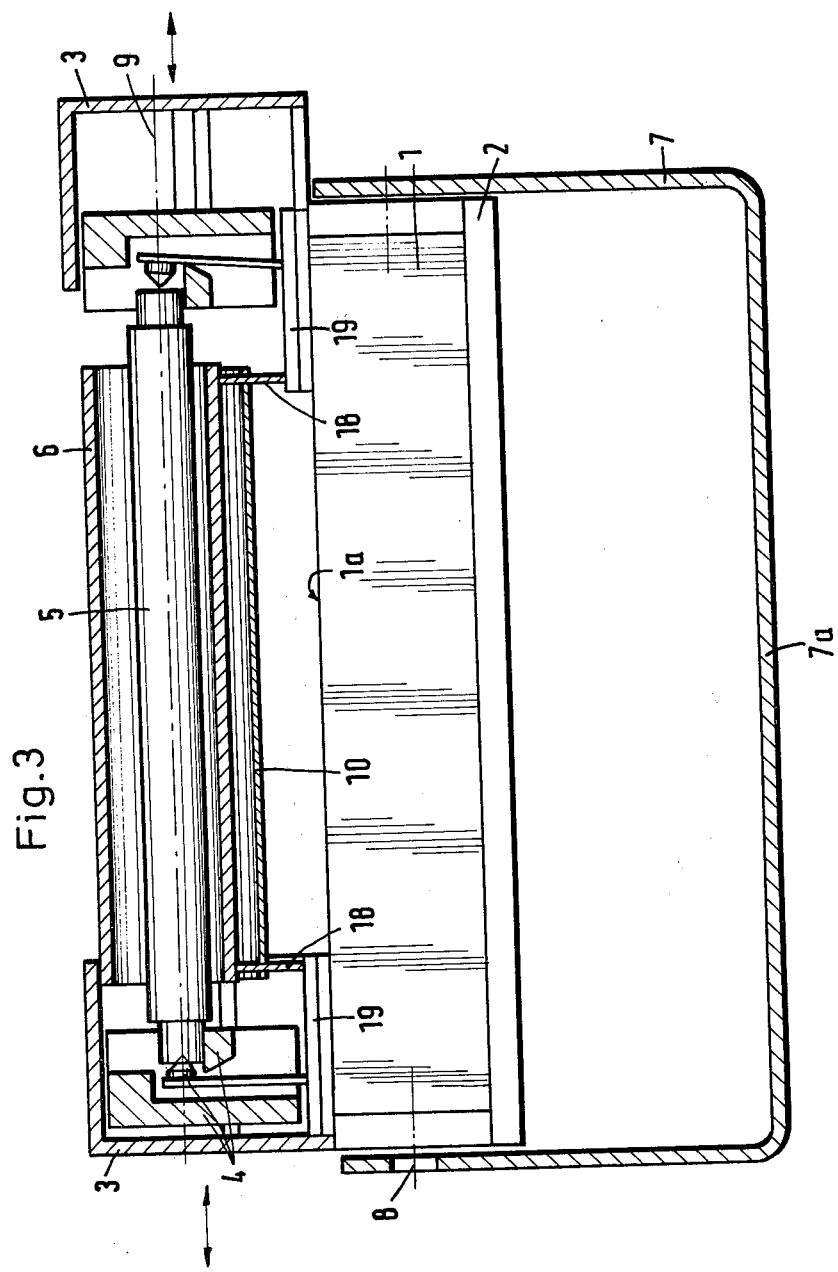
FIG. 3 is a longitudinal section through the light shown in FIGS. 1 and 2, but with the bracket tilted downwardly.

When the lamp 5 is to be replaced or removed for inspection, together with its tube 6, the two socket 3 can be shifted lengthwise of the housing 1 in opposite directions to the extended position shown at the right side in FIG. 3 from the closed position shown at the left side of FIG. 3, in both of which positions they can be arrested. The arresting means are known per se and have therefore not been illustrated.

Figure 2:
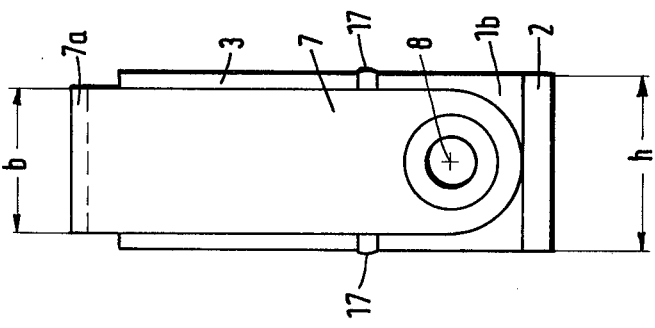
FIG. 2 is a front view of the light of FIG. 1, with the light baffles as well as the bracket being moved to the storage or non-used position.

A bracket 7 is pivoted to the end faces 1b of the housing 1 so that it can tilt about a pivot axis 8 which extends parallel to the longitudinal axis 9 of the lamp 5. The arm of portion 7a of the bracket 7 which extends parallel to the lamp axis 9 covers the lamp 5 when the bracket 7 is moved to its rest position, i.e. the position shown in FIG. 2 in which it is not in use. The height h of the housing corresponds approximately to the width b of the portion 7a of the bracket 7, as is also shown in FIG. 2.

In their closed or closest-together position that is shown at the left side in FIG. 3 the sockets are flush with their respective end face 1b of the housing 1. They carry between themselves a reflector part 10 which is of arcuate cross section and mounted as a fixed part of the housing. In addition, light baffles 12 are mounted in the two sockets 3 so as to be tiltable about pivot axes 11 extending parallel to the longitudinal lamp axis 9. In the operating position of the device these baffles 12 are moved to the position shown in FIG. 1, whereas in the rest or non-used position of the device they are pivoted in the direction indicated by the arrows 13 shown in FIG. 1, until they lie flat against the major surfaces 1c of the housing 1. The pivot axes 11 are located beneath the longitudinal axes 9 of the lamp 5 (see FIG. 1) and in the non-used position the two light baffles 12 merge within the outer contour of the housing 1 and cover the free space between the protective tube 6 and the upper longitudinal side 1a of the housing 1. For better illustration these baffles 12 are omitted in FIG. 3. It will be appreciated that in accordance with the optical requirements the baffles 12 need not be planar, but it could also be slightly curved and/or stepped. The pivot axis 8 and the lamp axis 9 are always located in a common plane, as shown in FIG. 1. FIG. 2 shows in addition that in the condition of non-use of the right-angular body formed by the housing 1, the cover 2, the parts 4, the lamp 5 and the reflector 10, 12, a plane passing through the pivot axis 8 of the bracket 7 and through the axis 9 of the lamp 5, is a plane of symmetry of the device.

As shown in FIG. 1 the baffles 12 may be covered by pivotable heat protective shields 14 which, in the condition of non-use, are located between the housing 1 and the baffles 12. At the left-hand side of FIG. 1 there is illustrated a spring 15 (a similar one will be at the right-hand side) which acts upon the baffles 12 and upon the heat shields 14 during their pivoting movement. Alternatively, spring elements 16 may be provided (shown at the right-hand side of FIG. 1 with similar elements being provided at the left-hand side, or else the elements 15 and 16 can be provided at alternate sides as shown) and these spring elements 16 urge the baffles 12 to their operating position as shown in FIG. 1. A manually disengageable latch 17 may also be provided which limits the pivoting movement of the housing 1 relative to the bracket 7.

FIG. 3 shows that the reflector part 10 is mounted in spring brackets 18 which in turn are fixedly mounted on the housing. This Figure also shows that each of the sockets 3 has a guide 19 in which it is slidable and which may be provided by forming it directly on the upper longitudinal side 1a of the housing 1. An alternative embodiment provides for the sockets 3 to be removably connectable to the housing 1 via a plug-in type of connection; however, this is not illustrated.

The housing 1 may be of synthetic plastic material whereas the sockets 3 are currently preferred to be made from pressure-cast metal. The height h of the housing corresponds approximately to the diameter of the protective tube 6. The FIG. 1 shows two alternative possibilities for the heat shields 14, namely at the left-hand side it shows that the heat shields may be pivoted to the housing at the locations spaced from the associated baffles 12 whereas the right-hand side shows that the baffle and the associated heat shield may both be pivoted on the same pivot 11.

Of course, it will be understood that instead of two sockets it is possible to use a single socket 3, if for example the lamp 5 is of the type having only a socket at one end. The purpose of using the spring elements 15 is to make the pivoting of the baffles and/or heat shields more difficult, so that they will remain in a position to which they have once been moved.

While the invention has been illustrated and described as embodied in a photoflood light, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A photoflood light, comprising an elongated housing having an upper face and major surfaces; a reflector element upwardly spaced from said upper face and having a curved cross-section and extending lengthwise of said housing; a lamp mounted within said reflector and extending lengthwise of the same; means for supporting said reflector element and said lamp on said housing; and a pair of two light baffles mounted for tilting movement about pivot axes extending along respective opposite longitudinal edges of said reflector element, to and from a rest position in which they are located at least in parallel with the planes of respective major surfaces of said housing and define with the same a generally rectangular body.

2. A photoflood light as defined in claim 1; further comprising a substantially U-shaped bracket having a pair of legs pivotable about an axis parallel to the elongation of said lamp, and a bight portion connecting said legs to one another and overlying said lamp when said bracket is pivoted to a rest position thereof.

3. A photoflood light as defined in claim 2, wherein a plane passing through said axis of said bracket and through the longitudinal axis of said lamp is a plane of symmetry of the photoflood light.

4. The photoflood light as defined in claim 2, wherein the height of said housing substantially corresponds to the width of said bight portion of said bracket.

5. The photoflood light as defined in claim 1, further comprising at least one socket arranged to embrace the electrical elements of said lamp for electrical contacting of said lamp and mounted on the longitudinal side of said housing, said socket including a mounting portion for mechanical retention of said lamp.

6. The photoflood light as defined in claim 5, wherein two sockets are mounted on the longitudinal side of said housings, said sockets are positioned in alignment with the lateral sides of said housing in a locked position thereof, said reflector element is located between said sockets.

7. The photoflood light as defined in claim 6, wherein said sockets are mounted on the upper face of said housing so as to overlap said reflector element when positioned in alignment with the lateral sides of said housing.

8. The photoflood light as defined in claim 1, wherein said pivot axes of said light baffles are positioned beneath the longitudinal axis of said lamp.

9. The photoflood light as defined in claim 6, wherein said pivot axes of said light baffles are affixed to said sockets.

10. The photoflood light as defined in claim 1, wherein pivotally mounted heat protective shields are provided to cover said light baffles, said heat protective shields being located between said housing and said light baffles in non-use condition.

11. The photoflood light as defined in claim 10, wherein at least one first spring element is connected to said heat protective shields and said light baffles to bias the latter in the pivoting movement thereof.

12. The photoflood light as defined in claim 11, wherein at least one second spring element is connected to said light baffles and said heat protective shields to urge said baffles and said heat protective shields to their operating position.

13. The photoflood light as defined in claim 2, wherein a locking element is provided to limit the pivoting movement of said housing relative to said bracket.

14. The photoflood light as defined in claim 1, wherein said reflector element is mounted in spring brackets, said spring brackets being rigidly fixed in said housing.

15. The photoflood light as defined in claim 5, wherein said socket is releasably mounted on said housing.

16. The photoflood light as defined in claim 6, wherein said two sockets are releasably mounted on said housing.

17. The photoflood light as defined in claim 16, wherein said sockets are slidably mounted on said upper face.

18. The photoflood light as defined in claim 16, further including a transparent protective tube surrounding said lamp.

19. The photoflood light as defined in claim 18, wherein said protective tube is releasably supported in said sockets.

20. The photoflood light as defined in claim 16, wherein said housing is formed of synthetic plastic material.

21. The photoflood light as defined in claim 16, wherein said sockets are formed of pressure-cast metal.

* * * * *